INVENTORS:
Harold Poncher
Jerry E. Poncher

Sept. 1, 1953                    H. PONCHER ET AL                    2,650,849
                                   GRILLE GUARD
Filed Sept. 24, 1949                                              2 Sheets-Sheet 2

INVENTORS:
Harold Poncher
Jerry E. Poncher
BY
Thiess, Olson & Mecklenburger
Att'ys Patented Sept. 1, 1953

2,650,849

UNITED STATES PATENT OFFICE 2,650,849

GRILLE GUARD

Harold Poncher and Jerry E. Poncher, Chicago, Ill., assignors to Erie Manufacturing Co., Inc., Chicago, Ill., a corporation of Illinois Application September 24, 1949, Serial No. 117,562

9 Claims. (Cl. 293—64)

This invention relates to improvements in grille guards for vehicles having horizontal bumpers supported by arms from the vehicles and vertical bumperettes on the bumpers.

Grille guards as heretofore constructed are usually made to fit only one make of car. This is inconvenient and costly, and necessitates carrying a large stock of the different guards on hand.

It is an object of this invention to provide a grille guard of universal application to the majority of cars, whereby less cost is involved, less stock has to be carried, and more satisfactory results all around are secured.

Further objects are the provision of a grille guard having, severally, an upright adapted to fit over a bumperette and with its lower arm secured by a brace plate to any conveniently adjacent bumper support; an upright fitting over a bumperette with its lower horizontal arm or end connected by a brace plate and hanger with any conveniently located bumper-supporting arm; an upright adapted to fit over a bumperette and to be secured thereto at the upper and lower ends thereof even though the bumperette may vary in height, size, and form; and, in general, an upright of substantially universal application to cars having bumperettes.

Further objects and advantages will appear from the detailed description and the claims to follow, in connection with the accompanying drawing in which an embodiment of the invention is depicted, by way of example but not of limitation, and in which drawing—

Referring in detail to these drawings, the guard as usually installed comprises the two uprights 10 and the cross bar 11. Most cars are equipped with bumpers 12 and so-called bumperettes 13, usually two in number. The latter are attached to the bumper and usually project above and below the same. They are of strong sheet metal of channel cross section, with their vertical edges slightly notched and formed to fit and rest against the front face of the bumper, to which they are secured in any desired and well-known way.

Figure 6:
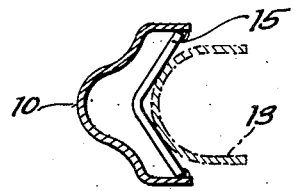
Fig. 6 is another cross section of the same at the plane indicated by the line 6—6 of Fig. 3.

The uprights 10 of this invention are made to fit over these bumperettes from the front and suitably to be secured thereto or thereon. These uprights are of strong sheet metal pressed into channel form with an outwardly bowed cross section and are bent at their lower ends into horizontal end portions or arms 14 extending back underneath the bumper and associated parts including a bumper 12, as later explained. In their vertical body portion they are preferably of the channel cross section shown in Fig. 6, presenting a pleasing exterior and a width to fit or accommodate most any bumperette 13. A V-shaped cross piece 15, Figs. 3 and 6, may be welded at its ends in the upright adjacent the top of the bumperette 13 against which the bumperette securely presses when the upright is placed thereover and is secured in place. Owing to the wedge or V-bend in this cross piece, the upright centers itself laterally on the bumperette regardless of the width or curve of the latter, to eliminate lateral play when the upright is secured thereto. This cross piece is made wide vertically to accommodate different heights of bumperettes.

Figure 3:
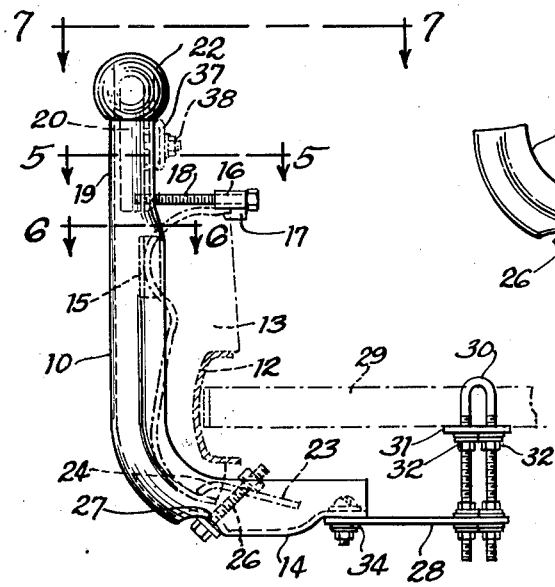
Fig. 3 is a side elevation of a guard upright as installed, parts of bumper and its supports and a bumperette being shown in broken lines.
Figure 4:
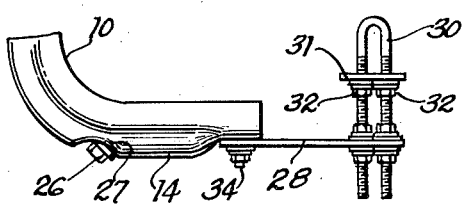
Fig. 4 is a detail view of the lower end of a guard upright, inverted U-bolt and brace plate.

To secure the upper end of the upright 10 to the bumperette 13, a cylindrical top clamp 16, Fig. 3, having a depending notched lug 17, to engage the top lip of the bumperette, is carried on cap screw 18 which when tightened clamps the upright to the bumperette.

Figure 5:
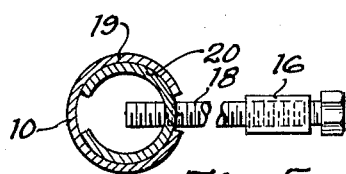
Fig. 5 is a cross section of one of the uprights near the upper end taken on the line 5—5 of Fig. 3.

The upper part 19 of the upright 10 is preferably compresed into circular neck form, seen in section in Fig. 5, with its edges separated sufficiently to form a vertical slot in the neck. Within this neck 19 of the upright is a reinforcing tubular section 20 closely fitting but slidable longitudinally inside the neck. This section may consist of a plate bent into substantially complete tubular form, as indicated in Fig. 5, with its solid part across the said slot. The top clamping screw 18 may be tapped into this reinforcing sleeve or plate 20 through the slot and thus securely clamp the upright to the upper end of the bumperette.

Figure 2:
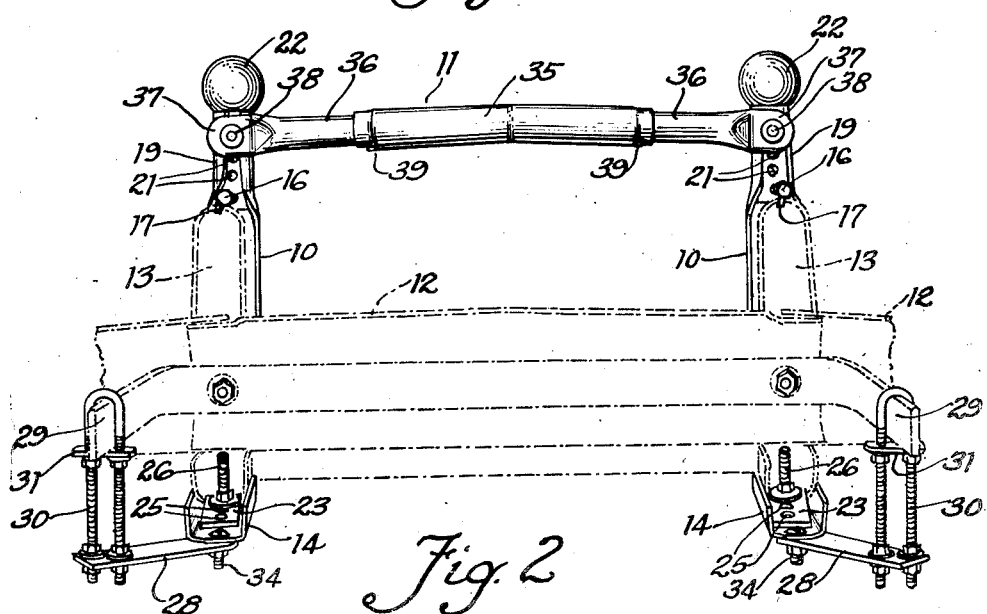
Fig. 2 is a rear elevation of the same, portions of the bumper and its supports of a car being in broken lines.

Since the bumperettes vary in height in different cars, this inner section 20 is made slidable for a limited distance in the neck 19 of the upright, and it is also provided with a plurality of tapped holes 21, Fig. 2, in vertical alignment and visible through the slot, so that the clamping screw may be threaded into, say, the lower hole and the slide be shifted up and down the neck, so that any height of bumperette can be suitably engaged by the clamp 16. The other holes 21 of the slide, as will be explained, are utilized for securing the end of the cross bar 11 of the guard.

The upper end of the upright is adorned by a hollow ball cover 22 of suitable proportions and which may be press-fitted over the upper end of the neck 19 which firmly secures it in place thereon but permits its removal in the shop with suitable tools if desired. The upright is secured in place on the bumperette at the lower end by an inside clamping plate 23 or bar bearing loosely at its inner end on the inside curved corners of the arm 14 and at its forward turned-down end 24 engaging over the lower lip of the bumperette 13, as shown, or in some cars on the lower lip of the bumper itself. This clamping plate is provided with a plurality of bolt holes 25 (Fig. 2) through one of which the bolt 26 is passed, the head of the bolt with a heavy and long washer being seated in an angularly floored depression 27 in the wall of arm 14 of the upright. A suitable plain washer, lock washer and nut thread on the bolt 26 to clamp the plate 23 firmly in place and thereby solidly clamp the upright to the bumperette. The several holes in the clamping jaw or plate 23 and its free rear end, as well as the inclined bolt 26 and depression 27 with an inclined seat or floor for the bolt head and its large bearing washer in the wall of the horizontal end or arm 14 of the upright, all combine to enable a suitable clamp to be made for the lower end of the upright 10 to the bumperette and bumper construction regardless of the particular relationship or position or form of the adjacent parts.

As thus constructed and secured in place, a force exerted at the top portion of the upright toward the rear of the car would cause the same to tend to move or rotate about the bumper as a fulcrum. This tendency is resisted by the strong bracing plate 28 shown separately in Fig. 8. This plate 28 is securely and firmly connected at its inner end to an overhead bumper-supporting arm 29 by a suitable inverted U-bolt 30, the legs of which straddle the arm and are secured thereto by a metal strap 31 connecting the legs beneath the arms and clamped thereto by a suitable plain washer, lock washer and threaded nut combination 32 on each leg. The lower ends of these U-bolt legs pass through holes 33, Fig. 8, in the end of brace plate 28 and are firmly secured thereto by suitable washer, lock washer and threaded nut combinations above and below the plate. The other end of this brace plate 28 underlaps the end of the horizontal arm 14 of the upright and is firmly secured thereto by a suitable screw bolt 34. The result is that any tendency for movement of the upright about the bumper as a fulcrum is strongly resisted by the brace plate 28 and hanger 30.

But the supporting arms of the bumpers are not all alike in the various makes of cars, do not extend forwardly at the same angle, and are not located the same relatively to the bumperettes; and they are not all at the same height relatively to the bumper and bumperettes and not of the same widths or vertical depths.

Figure 7:
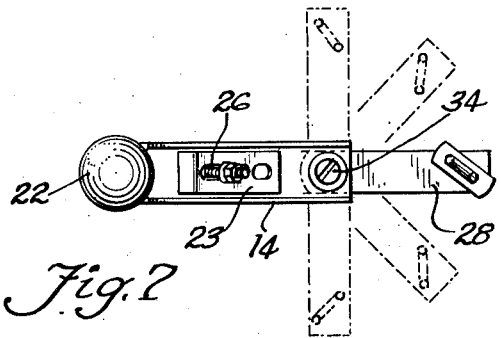
Fig. 7 is a plan view of one of the guard uprights and showing in full and broken lines various positions the brace plate may take at the lower end of the upright in applying the guard to various makes of cars.

The bolt 34 connection between the brace plate 28 and arm 14 of the upright 10 permits the approach of the brace plate to the arm from any horizontal direction apt to be encountered in such devices. This is indicated in Fig. 7, where the base plate 28 is indicated by dotted lines as coming to the bolt connection 34 from different positions or supports on both sides of the arm, the straight line position of the plate with reference to the arm being shown in full lines.

The legs of the U-bolt 30 are threaded nearly throughout their lengths to accommodate different widths of bumper-supporting arms such as 29, the strap plate 31 being positionable at the lower edge thereof and clampable firmly thereagainst by the nuts on the bolt legs regardless of the depth or width of the arm.

Likewise, these threaded legs of the hanger 30 allow for variations of height between a supporting arm, such as 29, and the horizontal arm 14 of the upright 10, since the bracing plate 28 may be threadably secured at any desired vertical height along said legs.

The legs of the U-bolt are preferably spaced apart more than the thickness of the bumper-supporting arm, such as 29, which permits said arm to pass between them at more or less of an angle from either side and thus makes the hanger readily adaptable to bumper supports extending at different angles to the bumpers. Moreover, this wide spread of the legs permits a less sharp bend in the rod forming the U-bolt, which is easier to make and less liable to breakage than a sharp bend, and which gives room between the legs for the washer and nut combinations on each leg and their operation by wrenches or otherwise.

Figure 8:
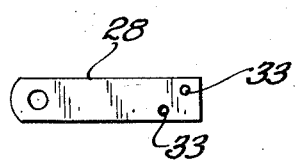
Fig. 8 is a detail plan view of the said brace plate alone.

The location of the holes 33 diagonally across the end of brace plate 28, Fig. 8, also gives room for the spaced U-bolt legs without unduly widening the plate 28, thus saving metal and avoiding cumbrous construction, and places the plane of the U-legs at an angle most suitable for the passage of variously curved or positioned bumper-supporting arms.

Figure 1:
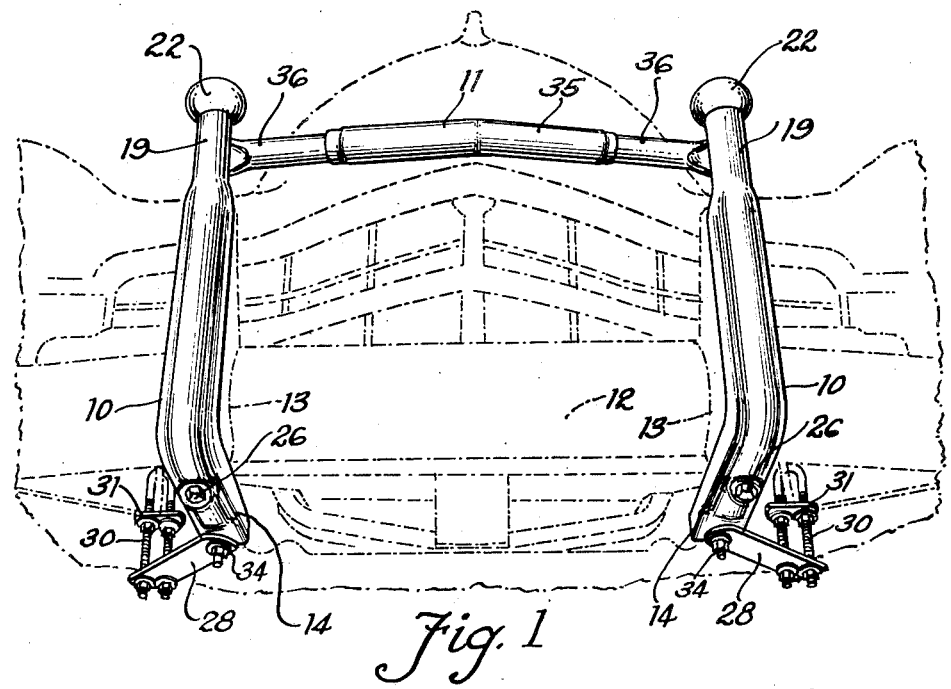
Fig. 1 is a front elevation of the grille guard and attachment plate as usually installed, the front end of portions of an automobile including bumper and bumperettes being indicated in broken lines.

If perchance the bumper-supporting arms extend at such an angle relative to the bumper that the U-bolt cannot readily be placed astride the same and make the desired connection of the brace plate with the arm of the upright, the said brace plate 28 may be turned over, which would then shift the U-bolt to an angle that will be satisfactory. In fact, a similar situation occurs in the usual installation where the brace plate does not extend back directly in line with the arm 14 of the upright, as shown more clearly in Figs. 1 and 2, since the bumper-supporting arms at the two ends of the bumper extend at opposite angles. In such case the brace plate is merely turned over at one side from that at the other side and the U-bolts in each are properly positioned to engage the respective bumper-supporting arms. Thus, but one form of bracing plate answers for all purposes and saves trouble and reduces costs of making, assembling, handling, and merchandising.

When the two uprights 10 are installed on a car, they are connected adjacent the tops by the cross bar 11, which preferably is of cylindrical tubing consisting of a central section 35 having a central forward V-bend and inside adjustable telescoping end sections 36. The outer ends of these end sections are flattened, as at 37, and are firmly bolted by screw bolts 38 to the upper ends of the uprights beneath the balls 22. The screw bolts 38 thread into the uppermost available hole 21 in the sliding reinforcing tubes 20 (Fig. 5) within the necks 19 of the uprights and visible through the slot in the neck, and when tightened, clamp the parts all rigidly together. When the end sections 36 are so secured in position, the central section 35 may be adjusted lengthwise so that the ends are equidistant from the uprights and so that the V is in the extreme forward position, and then the set screws 39, Fig. 2, in and adjacent the ends of the central section and bearing on the end sections are tightened to ensure holding the sections properly together.

As thus constructed and installed, with the uprights 10 over the bumperettes and clamped thereto, the U-bolts and brace plates in position and clamped to the arms 14 of the uprights, and the cross bar 11 in place and the whole tightened up, a very strong and efficient grille guard is provided for a car. And by its novel construction and ingenious variable attaching and connecting means at all points, as explained in detail, the guard becomes substantially universal in its fitting and applicability to all cars.

It will also be noted that both uprights are the same as well as all parts that go with them; that is, there are no rights and lefts, so that the manufacturing costs are reduced and the one device will fit on the majority of cars, which is an important advantage, particularly in merchandising, since an accessory store, for example, does not have to stock up for individual cars but only for the whole group. Such devices are sold largely as accessories, and when disassembled may be packaged with a sheet of installing instructions in small compass and handled as an over-the-counter product.

It is appreciated that various changes and alterations may be made therein without departing from the principle and scope of the invention as set forth or intended to be set forth herein and in the appended claims, but what is claimed and desired to be secured by Letters Patent is:

1. A universal grille guard for vehicles having variously positioned supports and bumpers and vertical bumperettes mounted on the bumpers, comprising a pair of guard uprights and a cross bar to connect their upper ends, each upright having a body portion channel-like in cross section adapted to be placed over the front of a bumperette, said upright extending above the bumperette at its upper end and being bent at its lower end to extend rearwardly and horizontally below the bumperette and bumper, clamping means to clamp the upright and bumperette together, a brace plate pivotally connected with the lower end of the upright and forming an extension thereof, an inverted U-bolt hanger adapted to be placed astride an adjacent support on the vehicle, said U-bolt having parallel legs spaced wider apart than the thickness of the supporting arm, said brace plate having apertures adjacent one end through which said legs are adapted to pass to secure the U-bolt and plate together, said apertures being diagonally arranged across the plate to receive the said widely spaced legs, the other end of said plate and the bent end of the upright overlapping, and clamping means to secure said ends together in any longitudinal angular relation, the said plate being reversible for use either side up to enable the U-bolt to be affixed to supports at different angles to the bumpers and to said lower ends of the uprights.

2. A grille guard upright for vehicles having horizontal bumpers and vertical bumperettes mounted on the bumpers, comprising a body portion channel-like in cross section adapted to be placed over the front of a bumperette, said upright extending above the bumperette at its upper end and being bent at its lower end to extend rearwardly and horizontally below the bumperette and bumper, a clamp to clamp the upright to the upper end of the bumperette, a clamp to clamp the upright at the lower end of the bumperette, a brace plate pivoted at one end to the said lower end of the upright and forming an extension thereof at any desired angle, hanger means firmly to connect the free end of said brace plate with any available support on the vehicle within the range of the arcuate movement of said free end of the plate, and means for firmly connecting the pivoted end of said brace plate with the rearwardly extending horizontal end of said upright at any angle thereto required by the relative positions of the said hanger and horizontal end.

3. A grille guard upright for vehicles having horizontal bumpers and vertical bumperettes mounted on the bumpers, comprising a body portion channel-like in cross section adapted to be placed over the front of a bumperette, said upright having a cylindrical neck portion with a vertical slot therein opening rearwardly above the body portion, a reinforcing member in said neck portion fitting the inside surface of the neck and overlapping said slot and slidable to different vertical positions in said neck portion, a clamping screw passing through said slot in the neck and threading into said slidable member, a bumperette engaging member on said screw to clamp the upright to the bumperette, and means for securing the lower end of the upright to the bumperette and bracing it from the vehicle.

4. A guard upright having a channel-like body adapted to fit over a bumperette on a vehicle and to extend above the same and having its lower end curved and extending horizontally under the bumperette, bumper and associated parts, variably positionable clamping means in the upper part of the upright to engage the upper part of the bumperette and clamp the upright thereto, a clamping plate within the horizontal end of the upright having an end to engage over the lower edge of the bumperette or bumper and its other end bearing on the inside of said horizontal end, said clamping plate having a plurality of holes intermediate the ends, a clamping bolt passing through one of said holes and through the wall of the said horizontal end to clamp the plate in position and the upright to the bumperette, the said wall of the upright having a depression therein forming an angular seat for the head of the said clamping bolt, and a brace plate and hanger means to connect the inner end of said horizontal end to a support above.

5. A grille guard for vehicles having horizontal bumpers and vertical bumperettes mounted on the bumpers, comprising a pair of guard uprights and a cross bar to connect their upper ends, each upright having a body portion channel-like in cross section adapted to be placed over the front of a bumperette, the walls of the body portion merging upwardly into a slotted cylindrical neck portion, an enlarged hollow head at the top of the neck portion, a circular reinforcing member fitting the inside of said neck portion and slidably adjustable therealong, said member having a series of tapped holes in line with the slot in the neck, a clamp for engaging the upper end of the bumperette, a threaded clamping bolt therefor adapted to thread into one of said tapped holes in said reinforcing member, a threaded bolt through the end of the cross bar adapted to thread into another of said tapped holes in the reinforcing member below said head and above the said clamping bolt, whereby the guard may be applied to bumperettes of variable heights and the cross bar be properly located with reference to the heads of the uprights, clamping means for securing the lower end of the upright to the bumperette, and bracing means for attaching the upright to a support on the vehicle.

6. A grille guard upright for vehicles having horizontal bumpers and vertical bumperettes mounted on the bumpers, comprising a body portion channel-like in cross section adapted to be placed over the front of a bumperette, a V-shaped cross plate of substantial vertical width secured inside the upper part of the body portion to engage and center the upper part of the upright on the bumperette, clamps to secure the upright to the bumperette, and bracing means to secure the lower end of the upright to a support.

7. A universal grille guard for vehicles having horizontal bumpers and vertical bumperettes mounted on the bumpers, comprising a pair of guard uprights and a cross bar to connect their upper ends, each upright having a body portion U-channel-like in cross section adapted to be placed over the front of a bumperette, said upright extending above the bumperette at its upper end and being bent at its lower end to extend rearwardly and horizontally below the bumperette and bumper, clamping means to clamp the upright and bumperette together, an elongated brace plate connected at one end to said lower end of the upright and forming an extension of said lower end, said plate being swingable about said connection with said lower end to adjustably position its other end adjacent a particular support on the vehicle, means for rigidly clamping said plate to said lower end in any such adjusted position, and means for firmly connecting said other end of said plate to the said support.

8. A universal grille guard for vehicles having horizontal bumpers and vertical bumperettes mounted on the bumpers, comprising a pair of guard uprights and a cross bar to connect their upper ends, each upright having a body portion channel-like in cross section adapted to be placed over the front of a bumperette, said upright extending above the bumperette at its upper end and being bent at its lower end to extend rearwardly and horizontally below the bumperette and bumper, clamping means to clamp the upright and bumperette together, an elongated brace plate pivoted at one end to said lower end of the upright and forming an extension of said lower end, said plate being adjustable about said pivot suitably to locate its free end under a particular support on the vehicle, means for rigidly clamping said plate to said lower end in any such adjusted position, and hanger means for firmly connecting said other end of said plate to said support above.

9. A universal grille guard for vehicles having horizontal bumpers and vertical bumperettes mounted on the bumpers, comprising a pair of guard uprights and a cross bar to connect their upper ends, each upright having a body portion channel-like in cross section adapted to be placed over the front of a bumperette, said upright extending above the bumperette at its upper end and being bent at its lower end to extend rearwardly and horizontally below the bumperette and bumper, clamping means to clamp the upright and bumperette together, an elongated brace plate connected at one end to said lower end of the upright and forming an extension of said lower end, said plate being swingable about said connection with said lower end to adjustably position its other end adjacent a particular support on the vehicle, means for rigidly clamping said plate to said lower end in any such adjusted position, and means for firmly connecting said other end of said plate to the said support, said last-named means consisting of an inverted U-bolt hanger adapted to be placed astride the said support, the depending legs of the U-bolt being threaded, a strap plate on said legs beneath the support, nuts on said legs to clamp said strap against the support firmly to clamp the U-bolt to said support, said legs below the strap passing through apertures in and adjacent the free end of said brace plate, and nuts on said legs above and below said plate to clamp the same to the U-bolt at any desired height within their limits to accommodate the said plate.

HAROLD PONCHER.
JERRY E. PONCHER.

References Cited in the file of this patent
UNITED STATES PATENTS

| Number | Name | Date |
|---|---|---|
| 2,536,234 | Sklarek | Jan. 2, 1951 |
| 2,580,775 | Helms et al. | Jan. 1, 1952 |